Aug. 10, 1926.  
J. T. CORLEY  
1,595,648  
NUMBER PLATE FRAME  
Filed Nov. 29, 1924
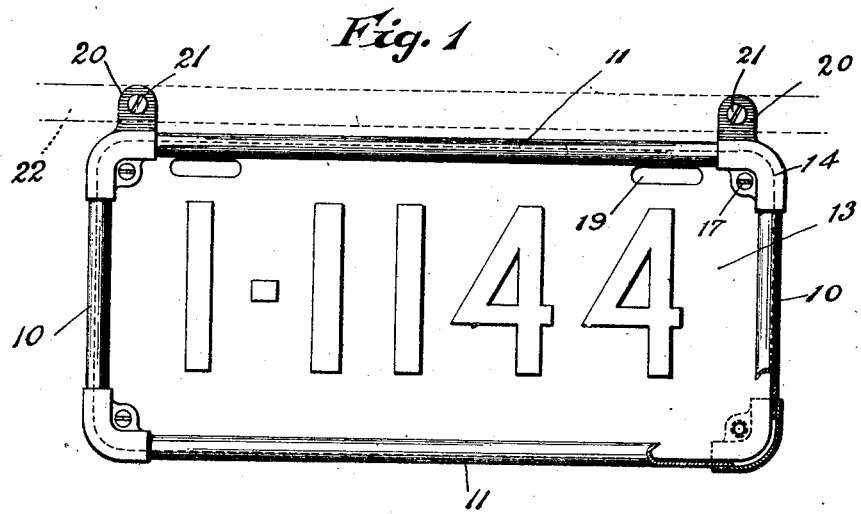
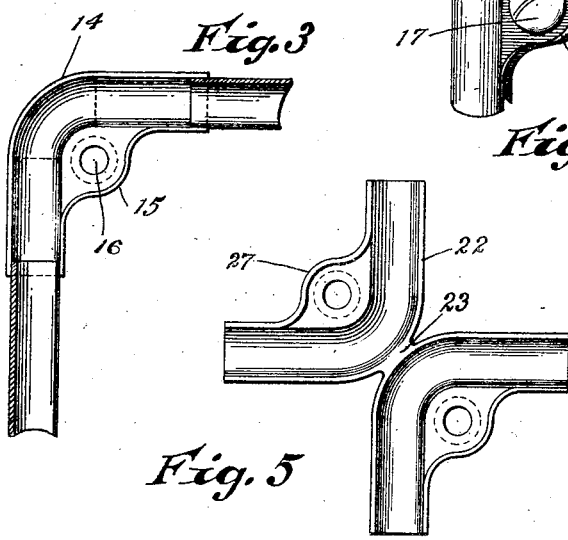
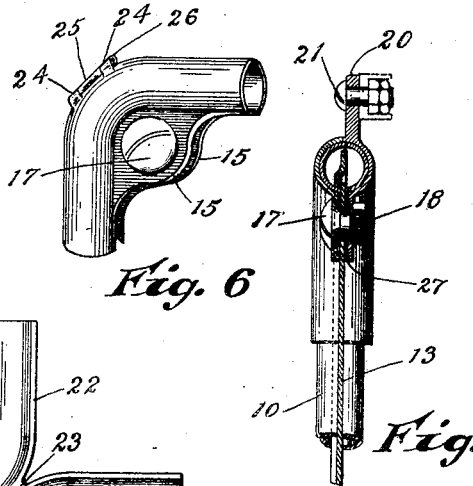
INVENTOR.
John T. Corley
BY Barlow & Barlow
ATTORNEYS.

Patented Aug. 10, 1926.

1,595,648

UNITED STATES PATENT OFFICE.

JOHN THOMAS CORLEY, OF PROVIDENCE, RHODE ISLAND.

NUMBER-PLATE FRAME.

Application filed November 29, 1924. Serial No. 752,893.

This invention relates to improvements in the construction of frames for number plates for automobiles and other uses; and the object of this invention is to provide a frame of this character of side and end tubular sections which are slotted longitudinally to receive and house the edges of the plate about which they are positioned, and the provision of angular corner clamps adapted to fit over these tubular sections, with means for binding these clamps onto the sections, and binding these sections onto the edges of the plate.

With these and other objects in view, the invention consists of certain novel features of construction, as will be more fully described, and particularly pointed out in the appended claims.

In the accompanying drawings;

Figure 1 is a front view showing my improved frame as applied to a number plate for an automobile.

Figure 2 shows one of the lengths of tubing for the sides of the frame, the same being slotted longitudinally throughout its length to receive the edge of the plate.

Figure 3 is a side elevation showing one of a pair of angular corner sections with the ends of the adjacent tubular frame sections inserted thereinto, the other of the clamp sections being removed.

Figure 4 is an edge view illustrating a pair of the corner sections as clamped in position, each to an adjacent tubular section and the sections clamped onto the plate, also showing an ear on one of the corner sections through which the frame may be connected to a support on an automobile or other device.

Figure 5 is a view showing a pair of corner sections as struck from sheet stock, said sections being connected together by a web between them permitting said half sections to be folded one upon the other.

Figure 6 is a perspective view illustrating a pair of these half sections as hinged together.

It is found in practice, of advantage to provide a metal frame which may be readily applied to the edge of a number plate for an automobile or for other purposes, and to make this frame as light as possible and also to form the same so that it will provide a handsome border about the number plate to render the same more attractive.

It is also found of advantage to form the frame sections of tubing slotted to receive the edges of the plate and to provide angular corner sections which are adapted to fit over the ends of the tubing and to provide a bolt for binding together the corner sections onto the tubular sections and at the same time binding the tubular sections onto the plate, to prevent rattling of the parts; and the following is a detailed description of the present embodiment of my invention showing one construction by which these advantageous results may be accomplished:—

With reference to the drawings, 10 designates the tubular end sections of my improved frame, and 11 the tubular side sections thereof. Each of these tubular sections is slotted longitudinally or provided with an opening through its side wall as at 12, the slot being of a width to receive and house the edge of the plate 13 and these sections are of a length a little less than that of the sides and ends of the plate they are to embrace.

In order to secure these tubular sections to the edge of the plate in a simple and practical way, I have formed the angular corner member 14 in halves, in concavo-convex shape so that when assembled they will form a tube to receive and be closed upon the adjacent ends of the tubular frame sections. Each of these angular corner sections is provided with an inwardly projecting ear 15 on its inner edge pierced at 16 to receive a bolt 17 so that when these two corner halves are placed together over the adjacent ends of the tubing, the nut 18 is set up on the bolt 17 which performs three functions: first, it binds the corner members onto the tubular frame members; second, by setting up this bolt it springs the tubular member together so as to bind the plate 13 in the slot thereof and third, this bolt 17 also clamps the ears 15 onto the plate 13 thereby positively preventing the parts from rattling when the bolts are all set up.

In mounting this plate with its frame on the supporting bar of the automobile chassis, in some cases, I pass the bolts through openings 19 usually formed in the number plate 13, but as this is more or less unsightly, I have in some cases, provided an ear 20 on each of the upper corner angled clamps through which bolts 21 are passed into the supporting bar 22, shown in dotted lines.

These angular corner tubular clamping members may be formed in any desired way and of any desirable material: in some cases, I cast them of thin brass, or other suitable material, with the supporting ear 20 thereon, while in other cases I may form these corner clamps from sheet stock, as illustrated in Figure 5, in which case, in some instances, I preferably connect the halves 22 by a web 23. In other instances, I may form a pair of ears 24 on the outer edges of one of the halves of the corner clamp and an ear 25 on the other half of the corner clamp and hinge these two together passing a pintle 26 through these ears, whereby when the bolt 17 is removed from its ears 15 these clamp halves may be swung apart to release or receive the other members of the frame.

In some instances, I provide a rib 27 about the inner edge of the ears 15, so that when the bolt 17 is set up it will exert pressure on this rib to bind the plate firmly between these ears.

My improved number plate frame is very light in weight, is inexpensive in construction and is handsome and attractive in appearance, and by its use the number of an automobile is rendered much more sightly.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A tubular frame for number plates formed of side and end tubular sections having a longitudinally disposed slot of less width than the diameter of the tubing to receive and house the edges of the plates about which the sections are positioned, and tubular corner frame clamps each formed of similar right angled sections, each section having an inwardly-extending pierced ear to embrace opposite sides of the plate and a binding bolt extending through the ears to bind the corner clamp to the tube sections, the ends of said tubular sections before being bound being slidable in said corner clamps to regulate the working dimensions of the frame.

2. A tubular frame for number plates formed of side and end tubular sections slotted longitudinally to house the edges of the plate about which they are positioned and sheet metal tubular corner frame clamps formed of a pair of right angled sections connected together on their outer edges, each half having on its inner edge a pierced ear, a bolt in said ear for binding said sections together onto the plate.

3. A tubular frame for number plates, comprising side and end tubular sections slotted to house the edges of the plates, angular tubular corner clamps formed in two parts hinged together, and a bolt through said clamp sections for binding them in position.

In testimony whereof I affix my signature.

JOHN THOMAS CORLEY.